United States Patent
Thielen et al.

[15] 3,673,563
[45] June 27, 1972

[54] VEHICLE BRAKE CONDITION TESTING AND SIGNALLING ARRANGEMENT

[72] Inventors: Heinz Thielen; Harald Grundmann; Franz Putz, all of Eschweiler, Germany

[73] Assignee: Rheinische Braunkohlenwerke AG, Koeln, Germany

[22] Filed: May 4, 1971

[21] Appl. No.: 140,060

Related U.S. Application Data

[63] Continuation-in-part of Ser. No. 759,536, Sept. 9, 1968, abandoned.

[30] Foreign Application Priority Data

Sept. 7, 1967 Germany..............................16734251

[52] U.S. Cl.................................340/71, 340/52 B, 340/53, 340/262, 73/129
[51] Int. Cl.........................................................B60q 1/44
[58] Field of Search .................340/52 R, 52 A, 52 B, 27, 53, 340/71, 72, 262; 73/121, 128, 129

[56] References Cited

UNITED STATES PATENTS 3,564,532    2/1971    Ando....................................340/71 X

*Primary Examiner*—Alvin H. Waring
*Attorney*—Michael S. Striker

[57] ABSTRACT

An arrangement for monitoring and testing of the wear state of mechanical brakes. The movable member which is to be braked operates in conjunction with a signal emitter that emits pulses as a function of the displacement of the movable member. A measuring arrangement is actuated by the pulses from the signal emitter and provides an indication of the braking interval between two predetermined limits of which the first determines the beginning of the monitoring interval and is dependent upon a threshold value. The second is determined by the end of the braking operation. A stepping relay is used as the indicating device by being actuated from a trigger circuit. A monostable multivibrator is included to increase the reliability of operation.

15 Claims, 6 Drawing Figures

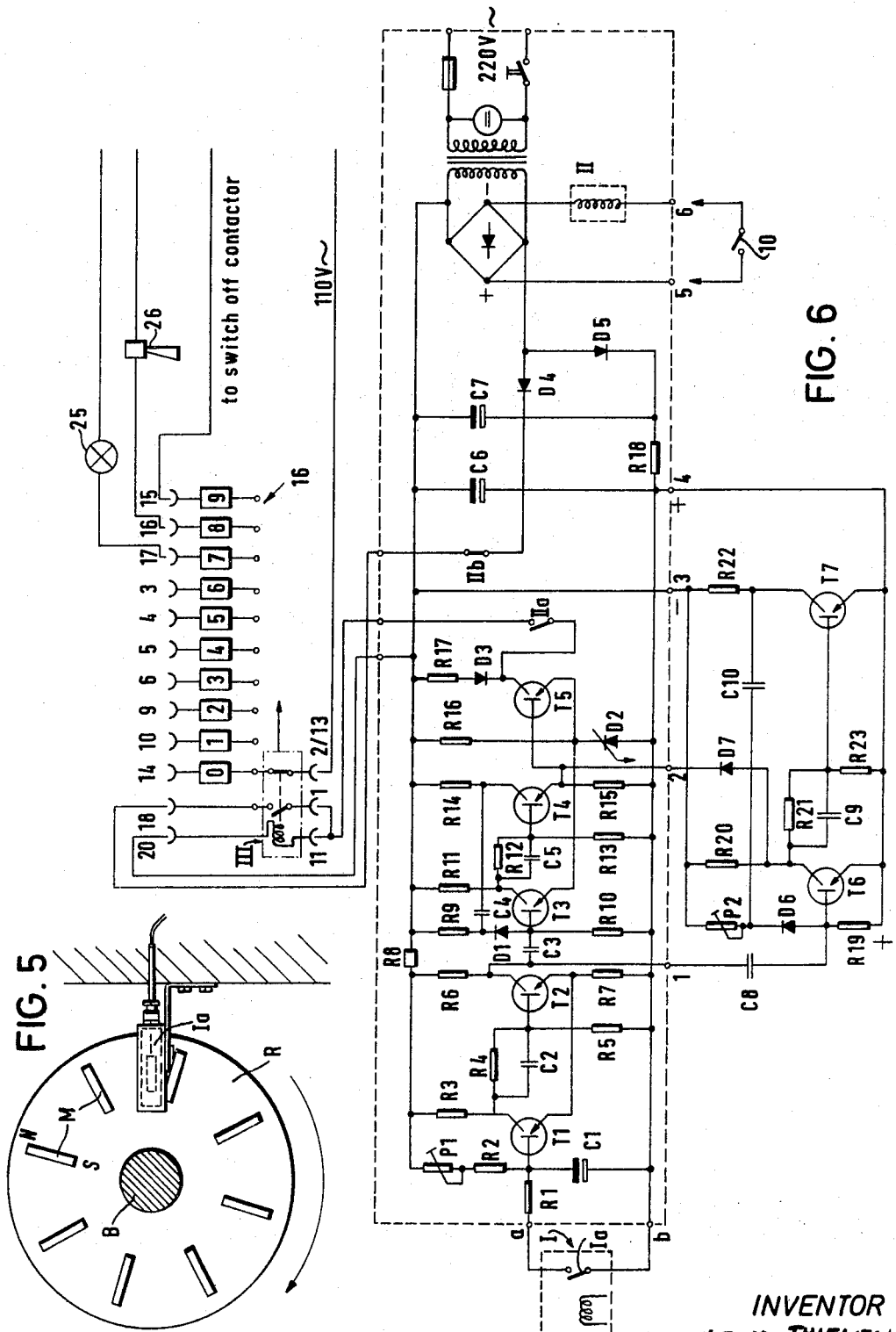

VEHICLE BRAKE CONDITION TESTING AND SIGNALLING ARRANGEMENT

CROSS-REFERENCE TO RELATED APPLICATIONS

The present application is a continuation-in-part application of Ser. No. 759,536, filed Sept. 9, 1968, entitled "Testing Arrangement For Mechanical Brakes," and now abandoned.

BACKGROUND OF THE INVENTION

It is known in the art to monitor the condition of mechanical brakes through observing the wear of the brake lining. This method of monitoring brakes is, however, unsatisfactory, since it is not possible to take into account variations in the frictional conditions which may result, for example, from soiling of the brake lining.

It has been proposed to carry out the monitoring of the brake in the manner wherein the braking time interval is measured from the instant that braking action is applied, to determine the condition of the brake. This scheme has, however, the disadvantage that the braking time varies in dependence on the rotational speed at the moment when the braking is begun. Accordingly, this scheme for determining the condition of brakes is useful only when the rotational speed is always the same at the beginning of the braking.

SUMMARY OF THE INVENTION

An object of the invention is an arrangement for monitoring the condition of brakes and which avoids the disadvantages described above.

A further object of the invention is the arrangement of the aforesaid object, which arrangement operates independently of the rotational speed at the beginning of the braking.

The present invention achieves these objects through an adjustable measuring arrangement in conjunction with a signal source. The beginning and end of the measuring interval are determined through limits in the form of threshold levels. The measurement of this arrangement can be based on either voltage or current, frequency or phase relationship, or on the basis of a comparison of these parameters.

The arrangement can be extended through the use of two limits or threshold levels for the purpose of fixing the beginning and end of the measuring interval. In another embodiment, the fixing of the beginning and end of the measurement can be done through the upper and lower limiting of the operating region of the measuring arrangement.

In accordance with the invention, the measurement is started by a switching circuit, such as a trigger circuit. The trigger circuit produces a rectangular pulse as a function of the closing and opening time of a circuit that comprises the timing circuit. This pulse is amplified and actuates a counting relay. The counting relay can include contacts for warning and switching off purposes, in addition to indicating contacts. When a mechanical counting relay is used, the arrangement can be designed to include a monostable multivibrator circuit in the control circuitry for the relay. The purpose of such a circuit arrangement is to ensure reliable operation of the counting relay, even when the relay is under the influence of the field of the actuating magnet. Such a condition may occur when the member to be monitored and carrying the magnet has to come to a stop that the magnet is near to the relay.

In accordance with the invention, the timing circuit has a capacitor that is charged and discharged. The counting relay is reliably operated independently of the charging and discharging time associated with the timing circuit.

The counting relay is advantageously not reset until the drive for the member is again turned on. With this design, the last measurement can always be read until the next measurement is taken.

The arrangement of the invention can be used practically whenever mechanical brakes are used. The applications of the present invention include machines in which lifting or revolving is done, as, for example, in coal mining. The invention is also applicable to rail vehicles and road vehicles. The different masses of the members being braked can be taken into account by providing that the one or more threshold values are made dependent upon the load torque or mass of the member to be braked.

Briefly, the invention consists of movable means for moving at a speed proportional to the speed of the member that is braked, switch means having first and second states and operated to alternate between the states at a rate proportional to the speed of the movable means during movement of the latter, circuit means having a time constant and being connected to the switch means, the circuit means including current source means and current storage means connected to the current source means and to the switch means to be charged by the latter when the switch means is in the first state and to be discharged when the switch means is in the second state, the time constant being such that the current storage means discharges to a predetermined voltage when the speed of the movable means has fallen to a predetermined value during braking, threshold voltage pulse means connected to the current storage means for delivering pulses during a period of time beginning whenever the current storage means has discharged at least to the predetermined voltage and ending not later than when the movable means has stopped, and counting means connected to the threshold voltage pulse means for counting the number of pulses during this period of time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 5 schematically shows the disc and switch combination; and

FIG. 6 is a circuit diagram of a second embodiment.

DESCRIPTION OF THE PREFERRED EMBODIMENTS

Figure 1:
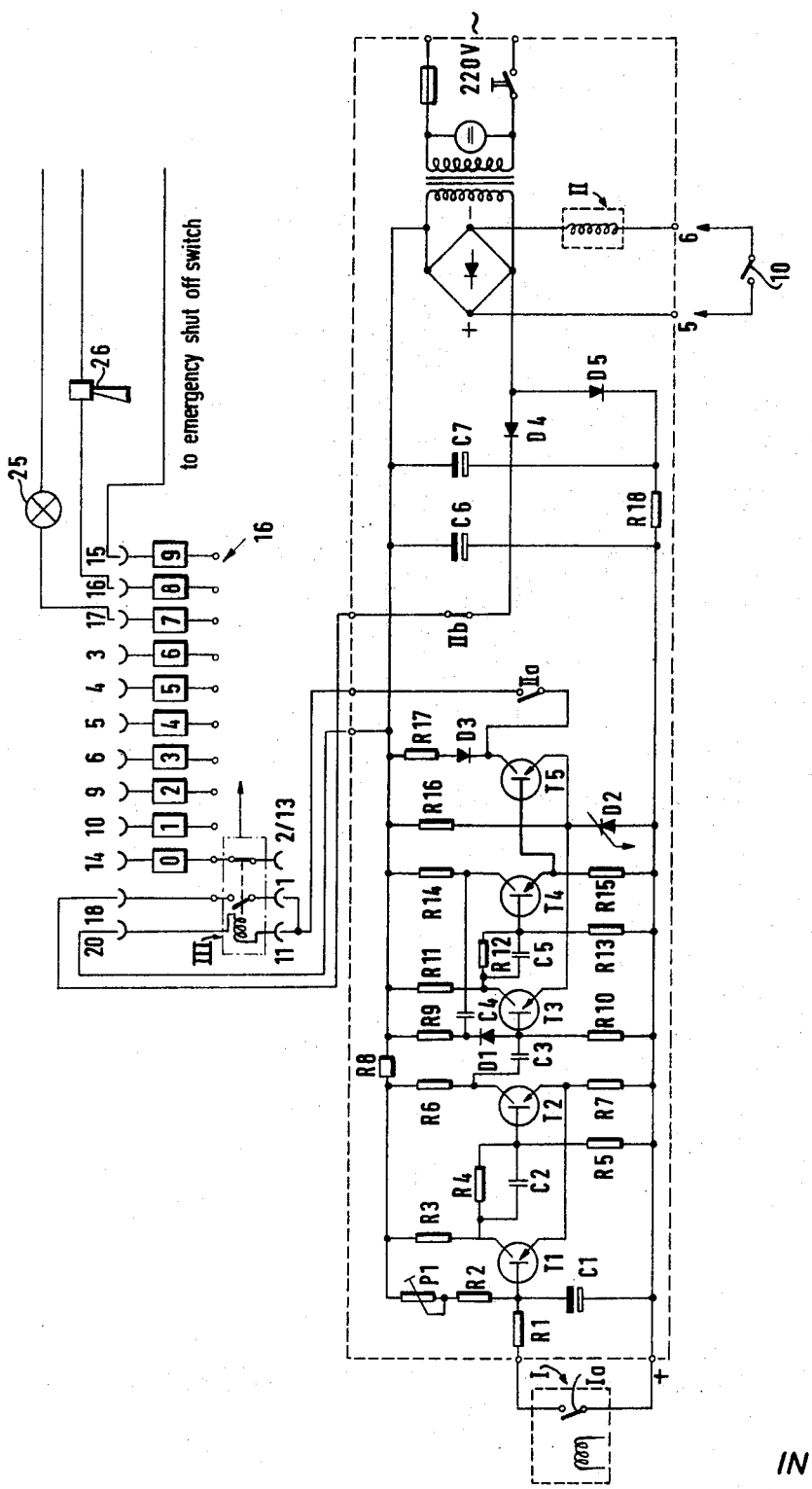
FIG. 1 is a schematic diagram of one embodiment of the invention.

Referring to the drawings, and in particular to FIGS. 1 and 5, one embodiment of the invention comprises a disc R of aluminum, or of other non-ferromagnetic material, fixed to the drive shaft B of the member to be braked. The aluminum disc has embedded into it one or more permanent magnets M which actuate the contact $Ia$ of a switch I, the contact being surrounded by a protective atmosphere. The switch, which can be a reed switch, is fastened on the frame of the machine or vehicle. Each magnet M passes the switch I once during each revolution of the member being braked. A separating distance of approximately 20 millimeters can be provided between the relay and the actuating magnet, when the latter passes by the former. In order to ensure reliable operation under dusty and vibrational conditions, the switch can be embedded or potted in materials having a synthetic or plastic base, including the epoxy derivatives. The switch I is connected between the two terminals $a$ and $b$ of the circuit including the resistor R1 and the capacitor C1. When the switching contact, or reed, $Ia$ is closed, the capacitor C1 is discharged through the resistor R1. An adjustable potentiometer P1 is connected in series with the capacitor C1, by way of a protective resistor R2. The capacitor C1 is charged through the potentiometer P1.

When braking is begun, the contact $Ia$ remains open and closed longer and longer as the rotational speed becomes less and less. This characteristic is utilized in the circuit to be described.

Connected to the junction of the resistor R1 and the capacitor C1 is the base of a transistor T1. The emitter of the transistor T1 is connected to the emitter of a similar transistor T2. The base of the transistor T2 is connected by a capacitor C2 and a resistor R4 in shunt to the collector of the transistor T1. A resistor R3 connects this collector to the negative side of the power supply. A resistor R5 is connected between the base of the transistor T2 and the positive terminal of the power supply. The collector of transistor T2 is connected by a resistor R6 to the negative side of the power supply. The transistors T1 and T2, together with the associated resistors and capacitors, comprise a Schmitt trigger circuit.

A monostable multivibrator circuit is formed by the transistors T3 and T4. The base of transistor T3 is connected by the capacitor C3 to the collector of the transistor T2. A diode D1, connected in series with a resistor R9, forms a path between the base of transistor T3 and the negative potential of the power supply. The resistor R10 is connected between the base of transistor T3 and the positive terminal of the power supply. A capacitor C4 links the collector of transistor T4 with the junction of the diode D1 and resistor R9. Resistors R11 and R14 connect the collectors of the respective transistors T3 and T4 to the negative terminal. A capacitor C5 couples the collector transistor T3 to the base of the transistor T4. The capacitor C5 is connected in parallel with the resistor R12, and a base resistor R13 is connected between the base of transistor T4 and the positive terminal of the power supply.

An amplifier transistor T5 amplifies the output pulses of the monostable multivibrator circuit for the purpose of actuating the stepping, or counting, relay III. The base of the transistor T5 is directly connected to the emitter of transistor T4, and by a resistor R15 to the positive terminal of the power supply. The emitter of the transistor T5 also leads to the positive terminal of the power supply, by way of a controlled rectifier D2. The emitter of transistor T5 is also connected to the emitter of transistor T3. The output on the collector of the amplifier transistor T5 is conducted to the relay III by a switching contact IIa, that is part of a cradle relay II. The latter is connected in series with a switching contact 10 which has its switching state controlled by the contactor of the drive motor for the shaft B. This contactor is functionally coupled to the rpm of the disc R. The circuit arrangement is such that when braking takes place, the required operating voltage is applied to the relay II, whereas half-wave pulses are applied to the relay II, when the braking is stopped and the drive motor is turned back on, for the purpose of resetting the counting relay III. The switching contact 10 is closed (preferably automatically) when braking is begun. When the relay II is actuated periodically through half-wave pulses, the switch contacting IIa is correspondingly actuated periodically, and the counter relay III is thereby pulsed and reset.

The arrangement operates in the manner whereby the capacitor C1 is charged when the braking is started. Depending upon the position of the switch contact Ia, the capacitor discharges through the resistor R1, or charges through the potentiometer P1 and the protective resistor R2.

Figure 2:
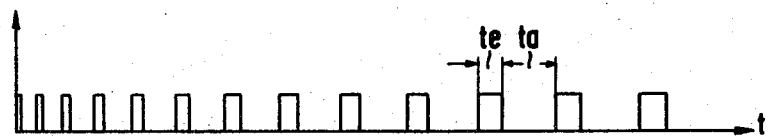
FIGS. 2 to 4 are graphs illustrating different values used in the explanation of FIG. 1.
Figure 3:
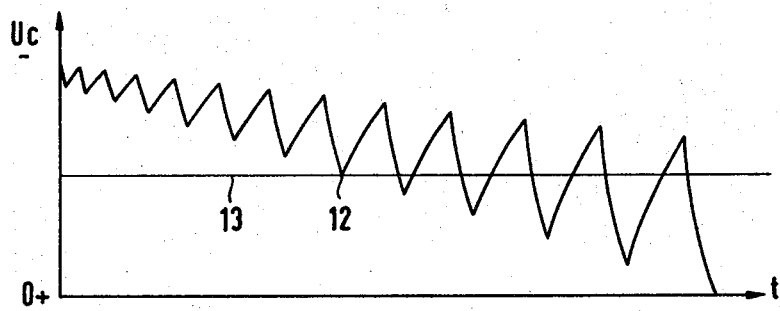

During braking, the switch I provides longer and longer closing and opening intervals *te* and *ta*, respectively, proportional to the decrease in the rotational speed. This condition is illustrated in FIG. 2 of the drawing. The setting of the potentiometer P1 serves to regulate the measuring time. Depending upon the setting of the potentiometer P1, the voltage Uc across the capacitor C1 can be adjusted so that the threshold value of the Schmitt trigger circuit is attained for a particular circumferential speed of the disc R. This results at the point 12 shown in FIG. 3, in which the line 13, drawn parallel to the abscissa of the graph, designates the threshold value. When Uc falls to this value, the transistor T2 suddenly becomes conductive and provides a rectangular pulse output. The positive edge of the pulses appearing at the collector of the transistor T2 controls, through the capacitor C3, the monostable multivibrator (transistors T3 and T4) and provides output pulses of approximately 25 milliseconds duration. The output pulses are amplified in the final stage by the transistor T5 and actuate the counting relay III.

In accordance with the invention, either P1 or R1, or both, can be adjusted to permit variation of the time constant of the charge and discharge circuits of the capacitor C1. The counting relay III is reset by the half-wave pulse conducted through the diode Dr when the drive motor is turned back on.

Figure 4:
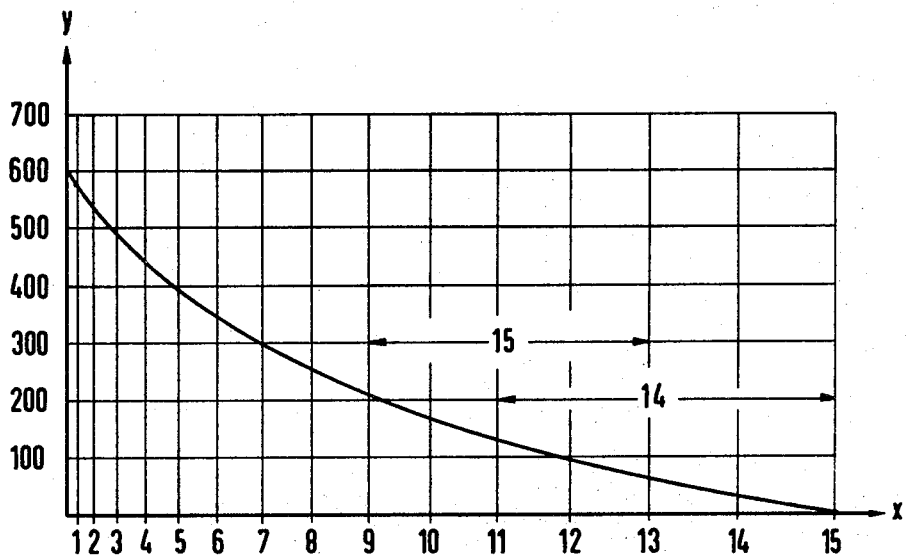

In accordance with the embodiment illustrated in the drawings, only the last rotations or the pulses resulting therefrom are used for the measurement. This corresponds to the measuring interval 14 shown in FIG. 4. In FIG. 4, the abscissa shows the number of pulses that appear at the input of the Schmitt trigger, and the ordinate shows the number of revolutions per minute of the disc R. The 15 pulses correspond to a time interval of approximately 5 seconds. The point at which the measurement begins (point 12 in FIG. 3) corresponds to the minimum normal speed of the mechanical driving arrangement of the member that is braked.

With satisfactory operating brakes, the number of pulses counted during the measuring interval between two limits of the rpm will always be approximately the same irrespective of the speed at which the brakes are first applied. The number of pulses is determined by the setting of the potentiometer P1. If the brakes are worn, the number of pulses counted correspondingly increases, because a longer period of time is needed to reduce the speed from the higher to the lower limit.

Throughout the measuring period of the counting relay III delivers pulses to the indicator, where they are summed. If a predetermined number of pulses is exceeded, this means that the brake is excessively worn, and a warning lamp 25, connected to the terminal 17, is illuminated. If the brake wears further, still more pulses are counted (since the disc R completes more rotations) during the measuring period, and an audible alarm 26 is sounded. Finally, still greater brake wear results in a sufficient number of pulses to operate an automatic shut-off switch (not shown) that is connected to the terminal 15.

In accordance with the invention, the end of the measurement can also be made independent of the end of motion of the braked member. FIG. 6 shows the circuit for this embodiment, which, in addition to the circuit shown in FIG. 1, also has an arrangement for opening the connection between the counting relay III and the monostable multivibrator, comprising the transistors T3 and T4. This arrangement consists of a further monostable multivibrator, composed of the transistors T6 and T7, the input of which a capacitor C8 connects to the collector of transistor T2. The coupling capacitor C8 is connected to the base of transistor T6, the emitter of which is directly connected to the positive rail of the power supply. The base of T6 is connected to the anode of a diode D6 and by a resistor R19 to the positive rail. An adjustable resistor P2 connects the cathode of diode D6 to the negative rail of the power supply. A parallel arrangement of a resistor 21 and capacitor C9 connects the collector of transistor T6 to the base of transistor T7, the emitter of which latter is directly connected to the positive rail. A capacitor C10 is connected between the cathode of diode D6 and the collector transistor T7, a resistor R22 connecting the collector to the negative rail. A resistor R20 connects the collector of transistor T6 to the negative rail. The output of the circuit is the collector of transistor T6, a diode D7 coupling this collector to the base of the output amplifier T5 of the measuring circuit comprising the transistors T1–T4.

The circuit just described operates in the following manner. When the measurement begins, the monostable multivibrator (transistors T6 and T7) is switched to its unstable state by the pulse that appears on the collector of transistor T2; and the base of transistor T5 is biased to conduct. By adjusting the value of the resistor P2, it is possible to vary the period of time required for the multivibrator to switch back to its stable state and therefore to turn off the transistor T5, thereby disconnecting the counting relay III from the measuring circuit.

The end of the measurement can also be set by using the draw in region of the measuring circuit, in which upper and lower limits fix the beginning and end of the measurement.

A definite beginning state is assumed, a value that determines this state changing continuously or step-by-step in a certain way but at first not affecting this state. Once the amount of change exceeds a certain threshold value, the beginning state suddenly changes to a degree that depends on how much the value has altered in the meantime. This range through which the value can alter without affecting the beginning state is called the *draw in region*. In accordance with the invention, pulses are counted until the draw in region is exceeded, whereupon the beginning state is suddenly changed. The beginning state corresponds to the threshold value of the Schmitt trigger or other means that starts the measurement period. The aforesaid value that determines the beginning state can be pulses that are converted into a voltage which, once this voltage reaches a definite value, provokes a different switching state.

In either of the immediately preceding embodiments, it is possible to carry out the measurement during the time, or pulse, interval 15 illustrated in FIG. 4. In this embodiment, the measurement is concluded before the rotations have stopped.

The numerically designated contacts 16 are provided for warning and registering signals.

The two capacitors C6 and C7 advantageously have a capacity of 500 $\mu$f.

It will be understood that each of the elements described above, or two or more together, may also find a useful application in other types of circuits differing from the types described above.

While the invention has been illustrated and described as embodied in a testing arrangement for mechanical brakes, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. An arrangement for monitoring the condition of the mechanical brakes of an apparatus by measuring the braking time, comprising, in combination, movable means for moving at a speed proportional to the speed of the member that is braked; switch means having first and second states and operated to alternate between these states at a rate proportional to the speed of said movable means during movement of the latter; circuit means having a time constant and being connected to said switch means, said circuit means including current source means and current storage means connected to said current source means and to said switch means to be charged by the latter when said switch means is in said first state and to be discharged when said switch means is in said second state, said time constant being such that said current storage means discharges to a predetermined voltage when the speed of said movable means has fallen to a predetermined value during braking; threshold voltage pulse means connected to said current storage means for delivering pulses during a period of time beginning whenever said current storage means has discharged at least to said predetermined voltage and ending not later than when said movable means has stopped; and counting means connected to said threshold voltage pulse means for counting the number of said pulses during said period of time.

2. An arrangement as defined in claim 1, wherein said movable means rotates.

3. An arrangement as defined in claim 2, wherein said movable means includes permanent magnet means mounted on said movable means to rotate therewith, and further wherein said switch means is a magnetically operated switch means.

4. An arrangement as defined in claim 1, wherein said current storage means is a capacitor, and further including at least one first reactor connected between said capacitor and said current source means to enable said capacitor to charge; and at least one second resistor connected to said capacitor to permit the latter to discharge.

5. An arrangement as defined in claim 4, wherein at least one of the first and second resistors is adjustable to permit alteration of said time constant.

6. An arrangement as defined in claim 4, wherein said first resistor and said capacitor are connected in series with said current source means, and said second resistor and switch means are connected in series and shunted across said capacitor.

7. An arrangement as defined in claim 1, wherein said threshold voltage pulse means is a trigger stage.

8. An arrangement as defined in claim 7, wherein said trigger stage produces pulses of which the lengths are dependent on said rate at which said switch means alternates between said first and second states.

9. An arrangement as defined in claim 8, wherein said trigger stage produces rectangular pulses.

10. An arrangement as defined in claim 8, including a monostable multivibrator connected between said trigger stage and said counting means for ensuring dependable operation of the latter irrespective of the shape and length of said pulses produced by said trigger stage.

11. An arrangement as defined in claim 9, further including amplifying means for amplifying said rectangular pulses, said counting means including stepping relay means connected to said amplifying means and operated by the amplified rectangular pulses, and said stepping relay means including contact means for indicating the positional state of said stepping relay means after actuation by said pulses from said amplifying means.

12. An arrangement as defined in claim 11, further including warning means connected to said contact means for giving warning when said pulses exceed a predetermined number.

13. An arrangement as defined in claim 11, further including switch off means for automatically turning off the driving means that causes movement of the member that is braked.

14. An arrangement as defined in claim 1, further including means for preventing delivery of said pulses to said pulse counting means at some time interval after said current storage means discharges to said predetermined voltage and before said movable means is stopped.

15. An arrangement as defined in claim 14, further including amplifier means connected between the output of said threshold voltage pulse means and said counting means, said means for preventing delivery of pulses being a monostable multivibrator means of which the input is connected to the output of said threshold voltage pulse means and of which the output is connected to said amplifier means so that said multivibrator means is switched to the unstable state thereof by the first pulse produced by said threshold voltage pulse means and the pulse produced by said multivibrator means when the latter switches back to the stable state thereof renders said amplifier means non-conductive.

* * * * *